United States Patent [19]
Geiger et al.

[11] 3,949,060
[45] Apr. 6, 1976

[54] PROCESS FOR THE PRODUCTION OF CYANOGEN CHLORIDE

[75] Inventors: Friedhelm Geiger; Werner Heimberger, both of Hanau; Hermann Schmitt, Rodenbach; Gerd Schreyer, Hanau, all of Germany

[73] Assignee: Deutsche Gold- und Silber-Scheideanstalt vormals Roessler, Germany

[22] Filed: Dec. 6, 1974

[21] Appl. No.: 530,612

[30] Foreign Application Priority Data
Dec. 21, 1973 Germany............................ 2363867

[52] U.S. Cl............... 423/379; 423/383; 260/248 C
[51] Int. Cl.² .......................................... C01B 21/18
[58] Field of Search ........... 423/371, 379, 383, 628; 260/248 C

[56] References Cited
UNITED STATES PATENTS
2,774,744  12/1956  Barrett et al......................... 423/628

FOREIGN PATENTS OR APPLICATIONS
674,813  7/1952  United Kingdom................. 423/383

Primary Examiner—Earl C. Thomas
Attorney, Agent, or Firm—Cushman, Darby & Cushman

[57]  ABSTRACT

Cyanogen chloride is purified and the service life of activated carbon is increased in the subsequent trimerization of the cyanogen chloride to cyanuric chloride by process comprising reacting hydrogen cyanide with chlorine, in a given case in the presence of cyanogen chloride produced in the presence of water, which in a given case contains chlorine. The improvement comprises passing the cyanogen chloride over granular gamma aluminum oxide with an alkali metal or in a given case an alkaline earth metal content of 0 to 3 weight % at 20°–100°C., preferably 30°–60°C.

11 Claims, No Drawings

PROCESS FOR THE PRODUCTION OF CYANOGEN CHLORIDE

The trimerization of cyanogen chloride to cyanuric chloride has been known for a long time, see Ullman, Enzyklopadie der Technischen Chemie, Vol. 5 (1954), pages 624–625. One of the best known large scale industrial processes produces the trimerization of cyanogen chloride on activated carbon as catalyst, namely at temperatures between 300° and 450°C., see Huemer German Pat. No. 833,490, Huember U.S. Pat. No. 2,753,346, Tokime German Pat. No. 1,147,592 and corresponding Tokime U.S. Pat. No. 3,018,288. The entire disclosures of these four patents is hereby incorporated by reference and relied upon.

It is known that the activated carbon catalyst used in the trimerization of gaseous cyanogen chloride only has a limited service life of 4 to 8 weeks. This service life was previously traced to the moisture content of the cyanogenchloride, see Riethmann German Offenlegungsschrift 2,045,786 and the corresponding Riethmann U.S. Pat. No. 3,607,872 and Ferguson German Offenlegungsschrift 2,045,823 and the corresponding Ferguson U.S. Pat. No. 3,607,873. The entire disclosure of both of these German Offenlegungsschrifts and both of the United States patents is hereby incorporated by reference and relied upon.

In order to increase the service life of the activated carbon, therefore, the cyanogen chloride which in its production in the normal manner accumulates in water saturated form is dried, namely either with the help of phosphorus pentoxide (German Offenlegungsschrift 2,045,786 and U.S. Pat. No. 3,607,872) or with calcium sulfate (German Offenlegungsschrift 2,045,823 and U.S. Pat. No. 3,607,873). The technical world was further of the view that other known drying agents such as silica gel, activated alumina, concentrated sulfuric acid, polyphosphoric acids or molecular sieves either reacted with cyanogen chloride or else brought about side reactions (loc. cit.) and therefore, did not come into consideration for a drying process.

Zeolitic molecular sieves, i.e., aluminum silicates on the contrary were even recommended in place of activated carbon for the trimerization of the cyanogen chloride, see German Offenlegungsschrift 2,159,040.

In spite of the above described procedures for the reduction of the moisture of the cyanogen chloride, the life of the activated carbon was to be sure increased but a regeneration of the activated carbon was necessary after at most 6 to 9 months, see German Offenlegungsschrifts 2,045,786 and 2,045,823 and U.S. Pat. Nos. 3,607,872 and 3,607,873 whereby the activity of the activated carbon already had subsided considerably.

Since according to our own investigations, the cyanogen chloride contains besides water still further impurities, partially of a known, partially of an unknown nature, which also in the treatment with phosphorus pentoxide or calcium sulfate go into the trimerization reactor and there poison the activated carbon catalyst, phosphorus pentoxide and calcium sulfate were also unsuited for a truly effective purification of the cyanogen chloride.

It was established that the named service life by the use of these substances (loc. cit.) cannot again be attained if the cyanogen chloride still contains small amounts of aromatics as impurities. This type of cyanogen chloride always results if there is used for its production an aromatic containing hydrogen cyanide, as results for example in the production of acrylonitrile.

Therefore, it was also tried already to increase the service life of the activated carbon catalyst if the hydrogen cyanide used for the production of cyanogen contained aromatics, by subjecting the hydrogen cyanide to an expensive purification, see German Pat. Nos. 1,271,091 and 1,282,625 and Schreyer U.S. Pat. No. 3,488,919 which combines the disclosures of the two German patents.

Furthermore, it was established by our own investigations that already the least amount of hydrocyanic acid in the cyanogen chloride likewise leads to a considerable shortening of the service life of the activated carbon catalyst.

In contrast, contrary to the state of the art, it has now been found that all of these difficulties are avoided and the life of the activated carbon catalyst can be lengthened extraordinarily if the cyanogen chloride produced by the reaction of hydrogen cyanide with chlorine in a given case in the presence of water, which in a given case contains chlorine, before entering the trimerization reactor is led over gamma aluminum oxide with an alkali metal or in a given case an alkaline earth metal content of 0 to up to 3 weight %, at 20°–100°C., preferably at 30°–60°C.

The alkali metal or alkaline earth metal content, better alkali metal in a given case also alkaline earth metal content, is preferably 0 to 1%. Of these metals there are preferred lithium, sodium or potassium and in a given case magnesium, calcium or barium. Sodium is especially preferred.

Chlorine containing cyanogen chloride is always present if hydrogen cyanide and chlorine are not used in equimolar amounts but are brought to reaction with a chlorine excess.

It has been proven that besides adsorption processes, chemical reactions can be catalyzed by passing the cyanogen over gamma aluminum oxide, namely therethrough, for example, gamma aluminum oxide can remove more water from cyanogen chloride than corresponds to its drying capacity.

These types of catalytic reactions, however, cannot be demonstrated by conducting wet cyanogen chloride over calcium sulfate or potassium pentoxide, see German Offenlegungsschrifts 2,045,823 and 2,045,786 and U.S. Pat. Nos. 3,607,872 and 3,607,873.

The particle sizes of the gamma aluminum oxide are not critical. However, they should be so selected that no uneconomically higher damming up pressure arises by leading the cyanogen chloride through the gamma aluminum oxide tower. For example, the particle size can be 1 to 20 mm.

The residence time can be varied within wide limits. Thus, there can be used residence times between 1 and 600 seconds. On economical grounds residence times of 1 to 60 seconds are chosen.

The cyanogen chloride resulting from passing through the gamma aluminum oxide no longer has a poisoning influence on the activated carbon. Accordingly, all the materials causing poisoning are removed by adsorption or chemical reaction.

Besides the process of the invention has the advantage that the spent gamma aluminum oxide used can be regenerated as many times as desired in simple manner, namely by heating to 200°–600°C., preferably to 350°–400°C., with simultaneous conduction of air therethrough.

Even after 12 months operation by purification of the cyanogen chloride by the process of the invention there cannot be observed any reduction in the activity of the activated carbon catalyst.

The technical advantage of the process of the invention is that by a technically simple prepurification of the cyanogen chloride which has been produced by chlorination of hydrocyanic acid, in a given case in the presence of water, the service life of activated carbon in the trimerization reactor is increased to a previously unknown height. Besides the thus obtained cyanogen chloride is usable not only for trimerization but also for all previously known reactions of cyanogen chloride.

Unless otherwise indicated, all parts and percentages are by weight.

EXAMPLE 1:

A glass reaction tube with an inside width of 9 mm and a length of 250 mm loaded with 12 grams of gamma aluminum oxide ($m^2/g = 250$, pore size A = 90, alkali content 0.05 weight % of sodium, particle size 2-3 mm) was heated to 60°C. and there were led through hourly 18 grams of a cyanogen chloride gas that contained 0.7% weight % water, 0.08 weight % hydrogen cyanide, 0.1 weight % benzene and 5.0 weight % chlorine.

The treated cyanogen chloride was condensed and subsequently analyzed.

For determination of the water content each time 10 ml of condensed cyanogen chloride were dissolved in 85 ml of carbon tetrachloride and the solution cooled sufficiently that a turbidity occurred. Then analyses showed that at a temperature of −40°C. there was still no turbidity, i.e., that the water content was <0.02 weight %. By gas chromatography neither benzene nor hydrogen cyanide could be detected.

Each time after purification of 350 grams of cyanogen chloride the gamma aluminum oxide was regenerated in a stream of air at 400°C. and subsequently used again. Even after 17 insertions in the process of purifying cyanogen chloride, the gamma aluminum oxide still had no loss of activity.

EXAMPLE 2:

For carrying out experiments on durability, two parallel inserted heatable pure nickel tubes 50 mm wide and 2000 mm long were each charged with 2.8 kg of gamma aluminum oxide ($m^2/g = 360$, micropore volume = 40 cm$^3$/100 grams, alkali content 0.6 weight % sodium particle size 5 to 7 mm). For purification of technical cyanogen chloride each time one of the two tubes was heated to 350°C. and hourly 2.6 kg of cyanogen chloride containing 0.2 to 0.3 weight % of water, 0.05 to 0.06 weight % of benzene and 3 to 3.5 weight % of chlorine were passed therethrough. Each time after 72 hours the second tube was inserted and the first tube regenerated by heating to 350° to 400°C. and blowing through air for less than 2 hours.

The thus-purified cyanogen chloride was continuously trimerized on activated carbon in an after provided reactor at 350°C. Even after an operation time of 12 months there was no reduction in the trimerization activity of the activated carbon.

EXAMPLE 3:

The procedure of Example 1 was followed but there was used a cyanogen chloride gas which instead of benzene contained 0.1 weight % of a mixture of benzene, chlorobenzene, 1,2-dichlorobenzene and 1,2,4-trichlorobenzene. The analyses showed that the cyanogen chloride treated with the gamma aluminum oxide contained less than 0.02 weight % water and neither detectable amounts of hydrogen cyanide nor of the aromatic components originally present. Even after 17 regenerations and subsequent renewed use the gamma aluminum oxide still showed no loss in activity.

The process can comprise, consist of or consist essentially of the recited steps.

The cyanuric chloride can be formed at conventional temperatures, e.g., 200° to 500°C.

What is claimed is:

1. A process of purifying impure cyanogen chloride gas prepared by the reaction of hydrogen cyanide with chlorine comprising passing the impure cyanogen chloride over gamma aluminum oxide at 20° to 100°C., said gamma aluminum oxide having 0 to 3 weight % of an alkali metal.

2. The process of claim 1 wherein the temperature is 30° to 60°C.

3. The process of claim 1 wherein the impurities comprise hydrogen cyanide, chlorine, water and an aromatic compound.

4. The process of claim 3 wherein the aromatic compound comprises benzene, chlorobenzene, dichlorobenzene or trichlorobenzene.

5. The process of claim 1 wherein the content of alkali metal in the gamma aluminum oxide is not over 1 weight %.

6. The process of claim 1 including the step of forming cyanuric chloride by passing the purified cyanogen chloride over activated carbon at a temperature at which cyanogen chloride is trimerized to form said cyanuric chloride.

7. The process of claim 6 wherein the amount of alkali member in the gamma aluminum oxide is not over 1 weight %.

8. The process of claim 6 wherein the impurities prior to purification comprise hydrogen cyanide, chlorine, water and an aromatic compound.

9. The process of claim 8 wherein the aromatic compound comprises benzene, chlorobenzene, dichlorobenzene or trichlorobenzene.

10. The process of claim 9 wherein the aromatic compound comprises benzene.

11. The process of claim 1 including the step of regenerating the gamma aluminum oxide by passing air therethrough at 200° to 600°C.

* * * * *